Patented Apr. 1, 1930

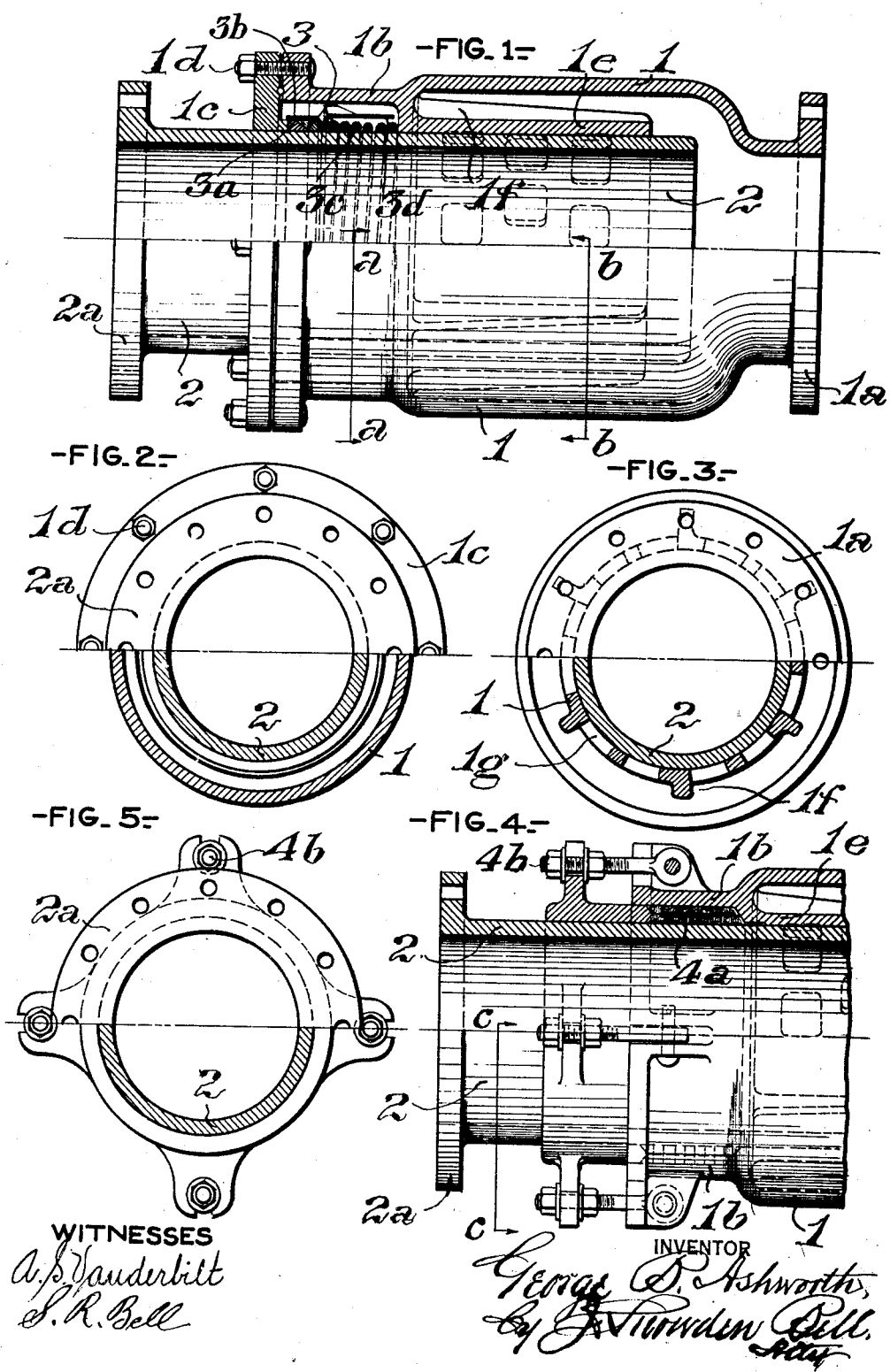

1,752,475

UNITED STATES PATENT OFFICE

GEORGE B. ASHWORTH, OF AMSTERDAM, NEW YORK

STEAM-PIPE EXPANSION JOINT

Application filed January 14, 1928. Serial No. 246,727.

This invention relates to steam pipe expansion joints, designed more particularly for application in locomotives, and its object is to provide an appliance of such type which will be of simple and inexpensive construction, ready applicability, and greater operative efficiency than in prior practice.

The improvement claimed is hereinafter fully set forth.

In the accompanying drawing: Figure 1 is a view, half in longitudinal central section, and half in side elevation, of a steam pipe expansion joint, illustrating an embodiment of the invention; Fig. 2, a view, half in end elevation, as seen from the left, and half in transverse section, on the line $a\ a$ of Fig. 1; Fig. 3, a view, half in end elevation, as seen from the right, and half in transverse section, on the line $b\ b$ of Fig. 1; Fig. 4, a view, taken similarly to Fig. 1, illustrating a structural modification; and, Fig. 5, a view, half in end elevation, as seen from the left, and half in transverse section, on the line $c\ c$ of Fig. 4.

In the practice of the invention, referring descriptively to the specific embodiment thereof which is herein exemplified, a hollow or chambered fixed member, 1, of cylindrical section, is secured by bolts, passing through a flange, $1^a$, on one of its ends, to a stationary section of steam pipe, and a movable member, 2, fitted to slide therein, is secured, by bolts, passing through a flange, $2^a$, on its end further from the flanged end of the fixed member, to a section of steam pipe which is movable, relatively to the fixed member, 1. The joint between the fixed and movable members, is made tight by metallic packing, 3, located in a stuffing box, $1^b$, formed integral with the fixed member, and compressed by a gland, $1^c$, and studs, $1^d$, connecting it to the fixed member.

To provide for adjusting the packing 3 to take up for wear, the packing is built up of bevelled rings $3^a$ which are enclosed in a metal sleeve $3^b$. A compressed coil spring $3^c$, enclosed in a metal sleeve $3^d$, bears at one end on the sleeve $3^b$ and acts to produce a wedging action between the bevelled packing rings whereby the rings are forced into leak proof contact with the movable member 2.

A sleeve bearing, $1^e$, bored out to fit truly on the movable member, extends from the inner end of the stuffing box, throughout the major portion of the remainder of the length of the fixed member. The bearing, $1^e$, is braced and stiffened by a plurality of circumferential ribs, $1^f$, which extend from the inner end of the stuffing box to the end of the bearing sleeve, and perforations, $1^g$, are formed in the bearing sleeve, intermediate the ribs, $1^f$, for the purpose of enabling any matter that might adhere to the movable member, to be wiped off by the latter in its movement. The ribs, $1^f$, being entirely clear of the wall of the fixed member, it will be seen that they will be surrounded by steam, thereby exposing both sides of the sliding joint walls to the same temperature, and leaving expansion characteristics unimpaired.

The fixed and movable members are formed of the same material, and are, therefore, subject to similar expansion conditions.

The structural modification shown in Figs. 4 and 5, accords, in all substantial particulars, with the construction hereinbefore described, differing therefrom in that ordinary packing rings, $4^a$, are applied, instead of metallic packing, and that the gland bolts, $4^b$, are pivotally connected to the fixed member instead of being threaded therein.

What is claimed as new and desired to be secured by Letters Patent is:

A steam pipe expansion joint comprising an outer section having a stuffing-box, and an inner, perforated bearing sleeve of annular cross section, integrally joined at one end only to the wall of the section, and spaced therefrom to form a steam chamber; an inner tubular portion passing through the stuffing box and slidably engaging the bearing sleeve, said sleeve being of substantial length to afford a support for the tubular portion; packing means in the stuffing box; means for adjusting the packing to take up wear thereof and means for joining the outer section and the tubular portion respectively to adjacent pipes.

GEORGE B. ASHWORTH.